US007477831B2

(12) United States Patent
Morishita

(10) Patent No.: US 7,477,831 B2
(45) Date of Patent: Jan. 13, 2009

(54) APPARATUS AND METHOD FOR VIDEO EDITING

(75) Inventor: Takuya Morishita, Tokyo (JP)

(73) Assignee: NEC Corporation, Tokyo (JP)

( * ) Notice: Subject to any disclaimer, the term of this patent is extended or adjusted under 35 U.S.C. 154(b) by 889 days.

(21) Appl. No.: 10/702,449

(22) Filed: Nov. 7, 2003

(65) Prior Publication Data

US 2004/0141722 A1  Jul. 22, 2004

(30) Foreign Application Priority Data

Nov. 8, 2002   (JP)   ............................. 2002-325263

(51) Int. Cl.
*G11B 27/031* (2006.01)
*G11B 27/10* (2006.01)
*G11B 27/30* (2006.01)

(52) U.S. Cl. ............................. 386/54; 386/52; 386/53; 386/98

(58) Field of Classification Search .................. 386/52, 386/53, 98, 55; 375/240.13
See application file for complete search history.

(56) References Cited

U.S. PATENT DOCUMENTS

| | | | | | |
|---|---|---|---|---|---|
| 5,999,692 | A | * | 12/1999 | Schmidt et al. | 386/54 |
| 6,104,441 | A | * | 8/2000 | Wee et al. | 375/240.15 |
| 6,285,825 | B1 | * | 9/2001 | Miwa et al. | 386/98 |
| 6,333,950 | B1 | * | 12/2001 | Karasawa | 375/240.23 |
| 6,480,669 | B1 | * | 11/2002 | Tsumagari et al. | 386/95 |
| 6,532,333 | B1 | * | 3/2003 | Ito | 386/52 |
| 6,594,439 | B2 | * | 7/2003 | Imahashi et al. | 386/52 |
| 6,707,778 | B1 | * | 3/2004 | Lin et al. | 369/83 |
| 2001/0036355 | A1 | * | 11/2001 | Kelly et al. | 386/52 |
| 2002/0087999 | A1 | * | 7/2002 | Kashima | 725/100 |
| 2003/0113097 | A1 | * | 6/2003 | Shibutani | 386/52 |

FOREIGN PATENT DOCUMENTS

| | | | |
|---|---|---|---|
| EP | 926678 A2 | * | 6/1999 |
| EP | 1089571 A2 | * | 4/2001 |
| JP | 7-327203 | | 12/1995 |
| JP | 11-155128 | | 6/1999 |

(Continued)

OTHER PUBLICATIONS

Watkinson, J. _The MPEG Handbook_. Oxford: Focal Press, 2004. p. 358.*
Shiu, J. et al. "A Low-Cost Editor for MPEG-1 System Streams". _IEEE Transactions on Consumer Electronics_ vol. 41, No. 3 (Aug. 1995): pp. 620-625.*

*Primary Examiner*—Thai Tran
*Assistant Examiner*—David N Werner
(74) *Attorney, Agent, or Firm*—Young & Thompson

(57) ABSTRACT

There is disclosed a video editing apparatus capable of editing video/audio data in which image and sound data are multiplexed at a high rate. The video editing apparatus for editing the video/audio data constituted by multiplexing the image and sound data includes editing control elements for rewriting a packet header of video data in a range designated by a deletion start frame and deletion end frame with respect to the video/audio data which is an editing object to constitute nullified data and for rewriting a packet header of audio data including the same synchronous reproduction time in the designated range to constitute the nullified data.

21 Claims, 6 Drawing Sheets

FOREIGN PATENT DOCUMENTS

| JP | 11-196376 | 7/1999 |
| JP | 11-205734 | 7/1999 |
| JP | 11176083 A * | 7/1999 |
| JP | 11-261962 | 9/1999 |
| JP | 11-266431 | 9/1999 |
| JP | 2000-23090 | 1/2000 |

* cited by examiner

APPARATUS AND METHOD FOR VIDEO EDITING

BACKGROUND OF THE INVENTION

1. Field of the Invention

The present invention relates to an apparatus and method for video editing, and more particularly, to a video editing apparatus which is capable of editing data constituted by multiplexing image and sound data at a high rate.

2. Description of the Related Art

One example of a conventional video editing apparatus is described in JP-A-H11-155128. The conventional video editing apparatus described in this publication will hereinafter be described with reference to the drawings. As shown in FIG. 6, this conventional video editing apparatus is constituted of a DVD-RAM drive 1 and a host system 2. The DVD-RAM drive 1 roughly includes a main control unit (CPU) 10, an input/output interface 11, a data management table 12, an access control unit 13, a disk (DVD) 14, and an encoder/decoder 15.

An outline of an operation of the conventional video editing apparatus constituted as described above will hereinafter be described. That is, the CPU 10 of the DVD-RAM drive 1 records (telerecords) digital image information transferred from the host system 2 via the input/output interface 11 in the disk 14. Next, in response to a command from the host system 2 accompanying a user's input operation, the CPU 10 reads the recorded image information from the disk 14, and transfers the information to the host system 2 via the input/output interface 11.

Here, it is assumed that a user checks a screen to indicate a cut position for cutting image data in a first half of the image information. The CPU 10 specifies a group of pictures (GOP) corresponding to the indicated cut position, and the cut position in the GOP based on management information of the data management table 12.

The CPU 10 uses the specified cut position of a GOP as a reference position to detect a picture type of a top part of the image data part of a last half. In this case, the CPU 10 refers, for example, to a GOP header to recognize the picture type of the top part. Here, when the picture type of the top part is an I type, the CPU 10 converts the image data part of the first half in which the cut position is the reference position to a reproduction nullified data. This reproduction nullified data means user data which is incapable of being reproduced as the image information. On the other hand, when the picture type of the top part is not the I (intra picture) type, the CPU 10 controls the encoder/decoder 15 to execute a process of converting the picture type of the top part to the I type.

The CPU 10 executes a process of expanding a region of the image data part of the last half to a region of the first half by an increase obtained by the conversion to the picture data of the I type. Moreover, the CPU 10 converts the image data part of the first half to reproduction nullified data to produce a new GOP.

After executing the conversion process in the GOP, the CPU 10 sets a management table A for managing the image information including the newly produced GOP, and a management table B for managing the image information which is a cut object. In the data management table 12, the image information managed by the management table A is managed as continuous reproduction data. On the other hand, the image information which is the cut object is managed as irreproducible data.

However, the above-described conventional video editing apparatus has the following problems.

A first problem is that data in which image and sound data are multiplexed cannot be edited. A reason for this is that means for nullifying the sound data is not disposed.

A second problem is that correct reproduction of the edited data can be guaranteed only on a decoder having a function of interpreting the management table. This is because time information for synchronously reproducing the image and sound is not correct after the editing.

A third problem is that the nullified data region remains on the disk after the editing and a disk capacity is wasted. This is because means for deleting the nullified data region after the editing is not disposed.

A fourth problem is that an editing point needs to be manually designated by the user. This is because means for automatically providing candidates for the editing point to the user is not disposed.

SUMMARY OF THE INVENTION

An object of the present invention is to provide a video editing apparatus capable of editing the video/audio data in which the image and sound data are multiplexed at a high rate.

Another object of the present invention is to provide a video editing apparatus which is capable of reproducing the edited data even on a usual reproduction device.

Still another object of the present invention is to provide a video editing apparatus which can effectively use the capacity of a recording medium, when duplicating the video/audio data in the recording medium.

To achieve the object, according to one aspect of the invention, there is provided an apparatus for editing video/audio data in which image and sound data are multiplexed, comprising: means for designating a range of the video/audio data to be an editing object by using a deletion start frame and deletion end frame thereof; and editing control means for rewriting a header of video data in the designated range to constitute nullified data and for rewriting a header of audio data including the same synchronous reproduction time in the designated range to constitute the nullified data.

In the apparatus according to the invention, the editing control means may rewrite an ID of the header of the video data and audio data in the designated range with a padding stream ID to constitute the nullified data.

In the apparatus according to the invention, the editing control means may re-encode a frame next to the deletion end frame of the video data as a frame which does not require information of another frame in extension to nullify the video data to the deletion end frame from the deletion start frame, when the next frame is a frame which requires the information of another frame in the extension.

In the apparatus according to the invention, the editing control means may remove the nullified video/audio data part and writes the video/audio data into a writable recording medium, when duplicating the edited video/audio data in the recording medium.

In the apparatus according to the invention, the editing control means may judge the nullified video/audio data part based on a stream ID of the video/audio data to remove the nullified video/audio data part, and writes the video/audio data in the writable recording medium, when duplicating the edited video/audio data in the recording medium.

In the apparatus according to the invention, the editing control means may acquire a reproduction time of the video data before/after the nullified video/audio data part, obtain a difference between the reproduction time before the nullified video/audio data part and that after the nullified video/audio data part, which is an offset value, use the offset value to correct the reproduction time of the video/audio data of and after the nullified video/audio data part, and write the video/audio data in the recording medium.

In the apparatus according to the invention, the editing control means may acquire a reproduction time of the video data before/after the nullified video/audio data part, obtain a difference between the reproduction time before the nullified video/audio data part and that after the nullified video/audio data part, which is an offset value, and use the offset value to correct the reproduction time of the video/audio data of and after the nullified video/audio data part in a nullification process of the video/audio data.

In the apparatus according to the invention, the editing control means may rewrite the header of video data and the audio data in the designated range, using a private header indicating a data size to be nullified, to constitute the nullified data, and skip reading the nullified video/audio data part, referring to the data size of the private header, to write the video/audio data in the recording medium, when duplicating the edited video/audio data into the writable recording medium.

The apparatus according to the invention, may further comprise editing position extraction means for extracting a format change part of the audio data in the video/audio data which is the editing object to provide a range of the video data including the same reproduction time as that in the format change part as the deletion start frame and the deletion end frame.

In the apparatus according to the invention, the video/audio data may be MPEG data, and the editing control means may rewrite packet headers of the video data and the audio data to constitute the nullified data.

In the apparatus according to the invention, the editing control means may re-encode the frame next to the deletion end frame of the video data as an I frame to nullify the video data including the deletion start frame to the deletion end frame, when the next frame is not the I frame.

According to another aspect of the invention, there is provided a method of editing video/audio data in which image and sound data are multiplexed, comprising the steps of: designating a range of the video/audio data to be an editing object by using a deletion start frame and deletion end frame thereof; and rewriting a header of video data in the designated range to constitute nullified data and rewriting a header of audio data including the same synchronous reproduction time in the designated range to constitute the nullified data.

In the method according to the invention, the rewriting step may comprise the step of rewriting an ID of the header of the video data and audio data in the designated range with a padding stream ID to constitute the nullified data.

In the method according to the invention, the rewriting step may comprise the step of re-encoding a frame next to the deletion end frame of the video data as a frame which does not require information of another frame in extension to nullify the video data to the deletion end frame from the deletion start frame, when the next frame is a frame which requires the information of another frame in the extension.

In the method according to the invention, the rewriting step may comprise the steps of removing the nullified video/audio data part, when duplicating the edited video/audio data in the recording medium and writing the video/audio data into a writable recording medium.

In the method according to the invention, the rewriting step may further comprise the steps of judging the nullified video/audio data part based on a stream ID of the video/audio data to remove the nullified video/audio data part, when duplicating the edited video/audio data in the recording medium and writing the video/audio data in the writable recording medium.

In the method according to the invention, the rewriting step may further comprise the steps of acquiring a reproduction time of the video data before/after the nullified video/audio data part, obtaining a difference between the reproduction time before the nullified video/audio data part and that after the nullified video/audio data part, which is an offset value, using the offset value to correct the reproduction time of the video/audio data of and after the nullified video/audio data part, and writing the video/audio data in the recording medium.

In the method according to the invention, the rewriting step may further comprise the steps of acquiring a reproduction time of the video data before/after the nullified video/audio data part, obtaining a difference between the reproduction time before the nullified video/audio data part and that after the nullified video/audio data part, which is an offset value, and using the offset value to correct the reproduction time of the video/audio data of and after the nullified video/audio data part in a nullification process of the video/audio data.

In the method according to the invention, the rewriting step may further comprise the steps of rewriting the header of the video data and the audio data in the designated range, using a private header indicating a data size to be nullified, to constitute the nullified data, and skipping reading the nullified video/audio data part, referring to the data size of the private header, to write the video/audio data in the recording medium, when duplicating the edited video/audio data into the writable recording medium.

The method according to the invention, may further comprise the step of: extracting a format change part of the audio data in the video/audio data which is the editing object to provide a range of the video data including the same reproduction time as that in the format change part as the deletion start frame and the deletion end frame.

In the method according to the invention, the video/audio data may be MPEG data, and the rewriting step may comprise the step of rewriting packet headers of said video data and said audio data to constitute the nullified data.

In the method according to the invention, the rewriting step may comprise the step of re-encoding the frame next to the deletion end frame of the video data as an I frame to nullify the video data including the deletion start frame to the deletion end frame, when the next frame is not the I frame.

According to a further aspect of the invention, there is provided a computer program for enabling a computer to execute the above-mentioned method of editing video/audio data in which image and sound data are multiplexed.

DESCRIPTION OF THE PREFERRED EMBODIMENTS

Figure 1:
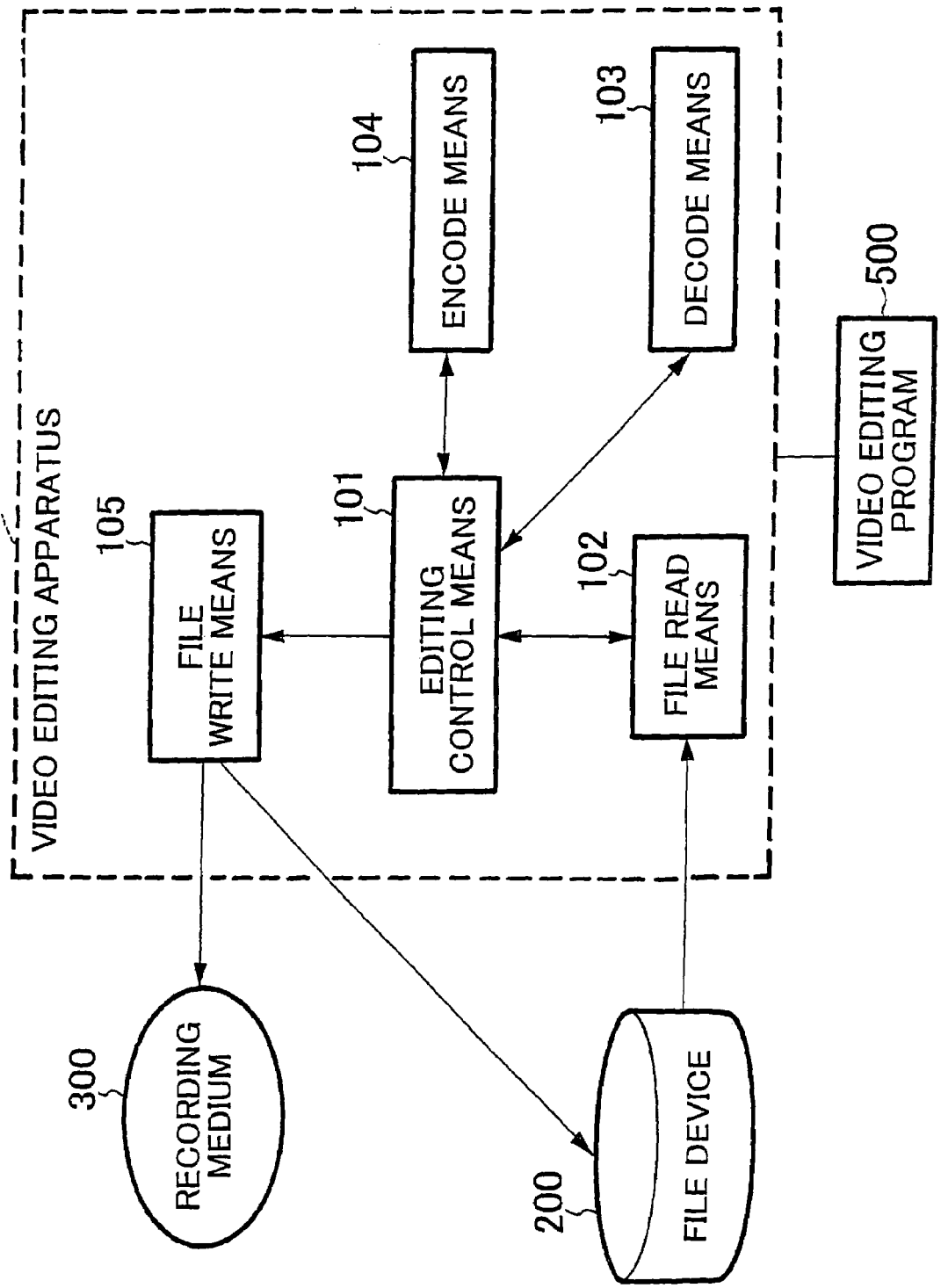
FIG. 1 is a block diagram showing a constitution of a video editing apparatus according to a first embodiment of the present invention.

Preferable embodiments of the present invention will hereinafter be described in detail with reference to the drawings. FIG. 1 is a block diagram showing a constitution of a video editing apparatus according to a first embodiment of the present invention. It is to be noted that FIG. 1 shows only a characteristic constitution of the first embodiment, and depiction of another general constitution is omitted.

Referring to FIG. 1, the video editing apparatus according to the present embodiment is constituted of a video editing apparatus 100 operated by program control, a file device 200, and a recording medium 300.

The video editing apparatus 100 is constituted of a computer including a program-controlled CPU, memory, and the like, and the apparatus includes editing control means 101, file read means 102, decode means 103, encode means 104, and file write means 105.

The editing control means 101 obtains a range of video/audio data to be deleted from a deletion start frame and a deletion end frame designated by a user with respect to the video/audio data, and replaces a header of the video/audio data to be deleted with a padding header to nullify the video/audio data of a deleted part.

The file read means 102 reads the video/audio data constituting an editing object from the file device 200 in which the video/audio data is recorded to supply the data to the editing control means 101.

The decode means 103 decodes encoded video data. The encode means 104 encodes the decoded video data. For these decode means 103 and encode means 104, means which have heretofore been provided can be used as they are.

The file write means 105 writes the video/audio data whose deleted part is nullified with respect to the file device 200, and removes the video/audio data nullified when reproducing the video/audio data in the recording medium 300 from the file device 200 to write the data in the recording medium 300.

The file device 200 is constituted, for example, of a hard disk drive in which the video/audio data is to be recorded. The recording medium 300 is a medium in which the video/audio data can be written, such as CD (e.g., CD-R and CD-RW) and DVD (e.g., DVD-RAM and DVD-R).

Next, a whole operation of the video editing apparatus according to the present embodiment constituted as described above will be described in detail with reference to FIG. 1 and a flowchart of FIG. 2.

First, the user operates the video editing apparatus 100 to designate the video/audio data constituting the editing object. Accordingly, the file read means 102 reads the video/audio data constituting the editing object from the file device 200 in which the video/audio data (e.g., MPEG data) is recorded to supply the data to the editing control means 101 (step 201).

Subsequently, for the read video/audio data, the user designates a deletion start frame to start deletion and a deletion end frame to end the deletion with respect to the editing control means 101 (step 202).

The editing control means 101 searches a data position of an encoded display start frame to be displayed next to the deletion end frame (step 203).

The editing control means 101 checks whether the encoded display start frame is encoded in an I type (frame which does not require information of another frame in extension), P type, or B type (frame which requires the information of the other frame in the extension) (step 204).

When the type of the display start frame is the I type, the editing control means 101 sets a broken link flag (flag raised when cutting and linking GOP) of GOP header including the display start frame (step 205).

When the display start frame is of the P type or the B type, the editing control means 101 acquires an I frame referred to by the display start frame from the file read means 102. The decode means 103 successively receives and decodes video frames encoded from the I frame referred to by the display start frame from the editing control means 101, and finally decodes the display start frame (step 206).

The encode means 104 receives the decoded display start frame from the editing control means 101 to encode the frame as the I frame anew (step 207).

The encode means 104 uses the re-encoded display start frame as a reference frame to encode video frames to the next appearing I frame anew (step 208). At this time, before/after performing the re-encoding, a data size of the video frame differs, but original data is overwritten so that a terminal end of the re-encoded data agrees with that of the data before the re-encoding.

The editing control means 101 rewrites stream ID of a packet header of all video data to the deletion end frame before the re-encoded display start frame from the deletion start frame with a padding stream ID value to replace a video packet of the video data with a padding packet (step 209). Accordingly, the deleted part designated by the deletion end frame from the deletion start frame is nullified.

The editing control means 101 calculates a presentation time stamp (PTS) value of a synchronous reproduction time which is time information for synchronous reproduction with respect to the frames in the range designated by the deletion start frame and the deletion end frame. The means also similarly rewrites the stream ID of the audio data having the PTS value in the corresponding range into the padding stream ID value to replace the audio packet of the audio data with the padding packet (step 210).

The editing control means 101 repeatedly executes the process for the replacement with the padding packet, when a plurality of deletion start frames and deletion end frames are designated by the user (step 211).

The video/audio data whose has been edited as described above is written in the file device 200 by the file write means 105 (step 212).

Figure 3:
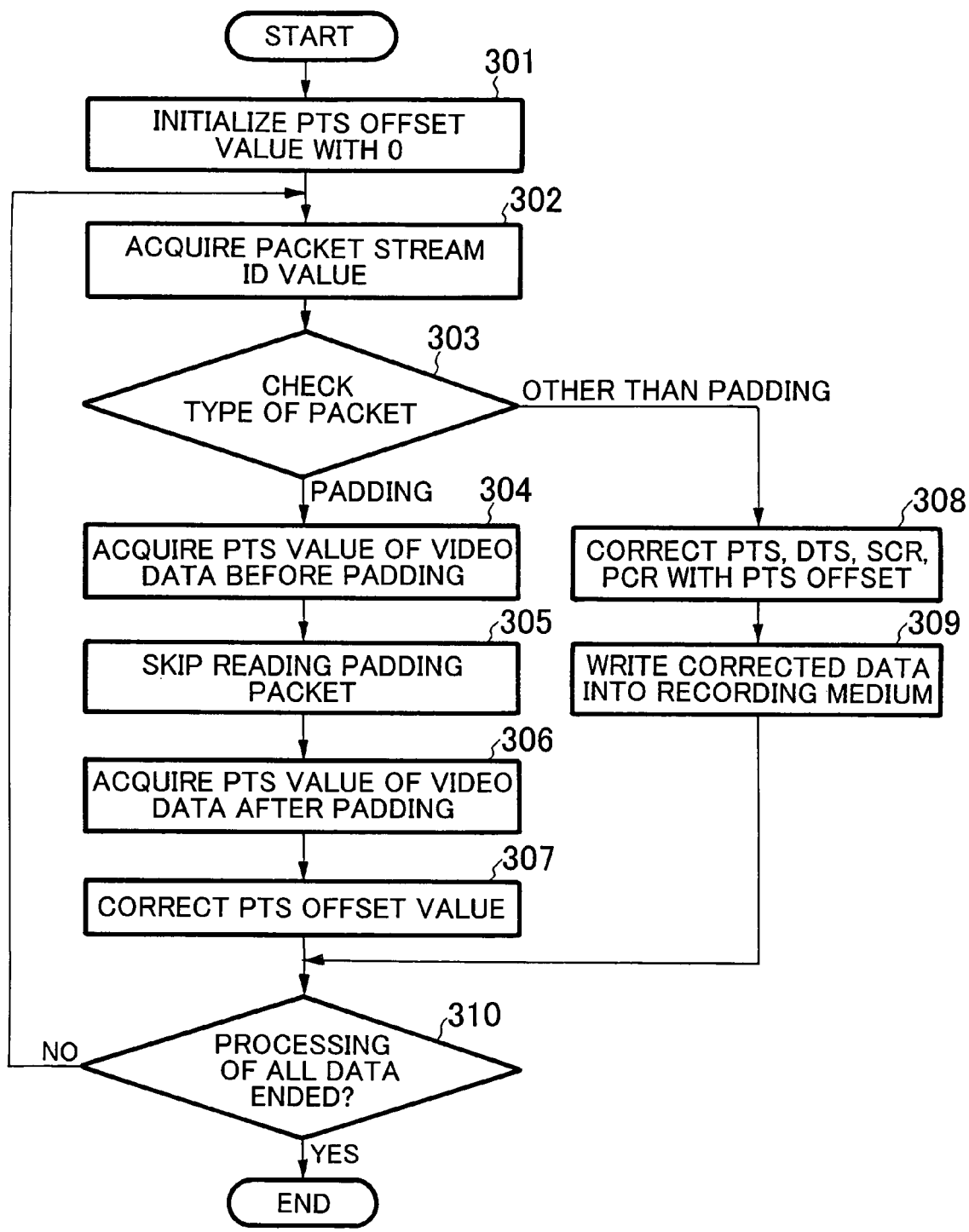
FIG. 3 is a flowchart showing an operation of duplicating process of edited video/audio data in the video editing apparatus according to the first embodiment of the present invention.

An operation for duplicating the edited video/audio data (e.g., the MPEG data) into the recording medium 300 from the file device 200 will be described in detail with reference to a flowchart of FIG. 3.

The file write means 105 initialize an offset value of the PTS value (hereinafter referred to as the PTS offset value) with 0 (step 301).

The file write means 105 acquires the value of the packet stream ID from the packet header of the video/audio data (MPEG data) (step 302), and judges whether or not the value of the packet stream ID indicates the padding stream ID (step 303).

Subsequently, the file write means 105 acquires the PTS value of the video data before start of the padding, when the value of the packet stream ID is the same as that of the padding stream ID (step 304).

Moreover, the file write means 105 skips a data write process into the recording medium 300 until the packet stream ID indicates a value which is not the same as that of the padding stream ID (step 305).

The file write means 105 acquires the PTS value of the video data after end of the padding (step 306), and adds a value obtained by subtracting the PTS value of the video data before the start of the padding from the acquired value to the PTS offset value (step 307).

The file write means 105 subtracts the PTS offset value from PTS value, or a decoding time stamp (DTS) value of the packet, when the value of the packet stream ID is not the same as that of the padding stream ID. Moreover, the PTS offset value is similarly subtracted from a system clock reference (SCR) value which is reference time information, or a program clock reference (PCR) value which is time information to be added to a transport stream (TS) (step 308).

Moreover, the file write means 105 data obtained by correcting the PTS value, DTS value, SCR value, and PCR value as described above into the recording medium 300 (step 309). The process of the steps 302 to 309 is continued to a data terminal end (step 310).

Next, a concrete operation example of the editing process of the video editing apparatus according to the first embodiment will be described.

Figure 4:
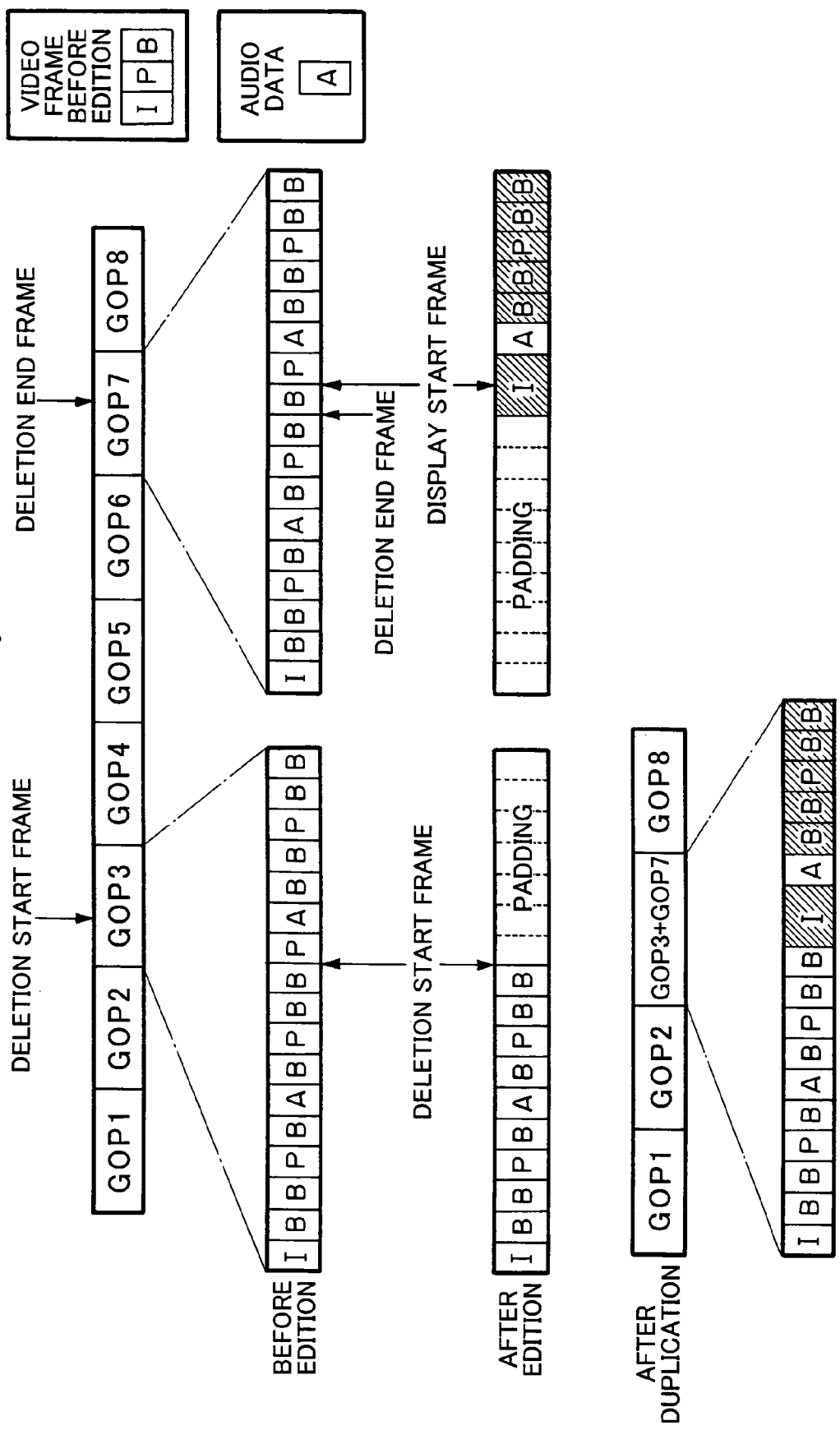
FIG. 4 is a diagram showing a concrete operation example of the video editing apparatus according to the first embodiment.

As shown in FIG. 4, the video/audio data (MPEG data) includes a data structure referred to as the packet. The header referred to as a packet start code is attached to the top of each packet. In this packet start code, attributes of streams are stored such as video, audio, padding, and private streams.

Furthermore, the video data has an editing unit referred to as GOP. The GOP includes data referred to as the one or more I frames which can be decoded alone. Additionally, there are a P frame to be decoded referring to front I, P frames, and a B frame to be decoded referring to front/rear I, P frames.

Figure 2:
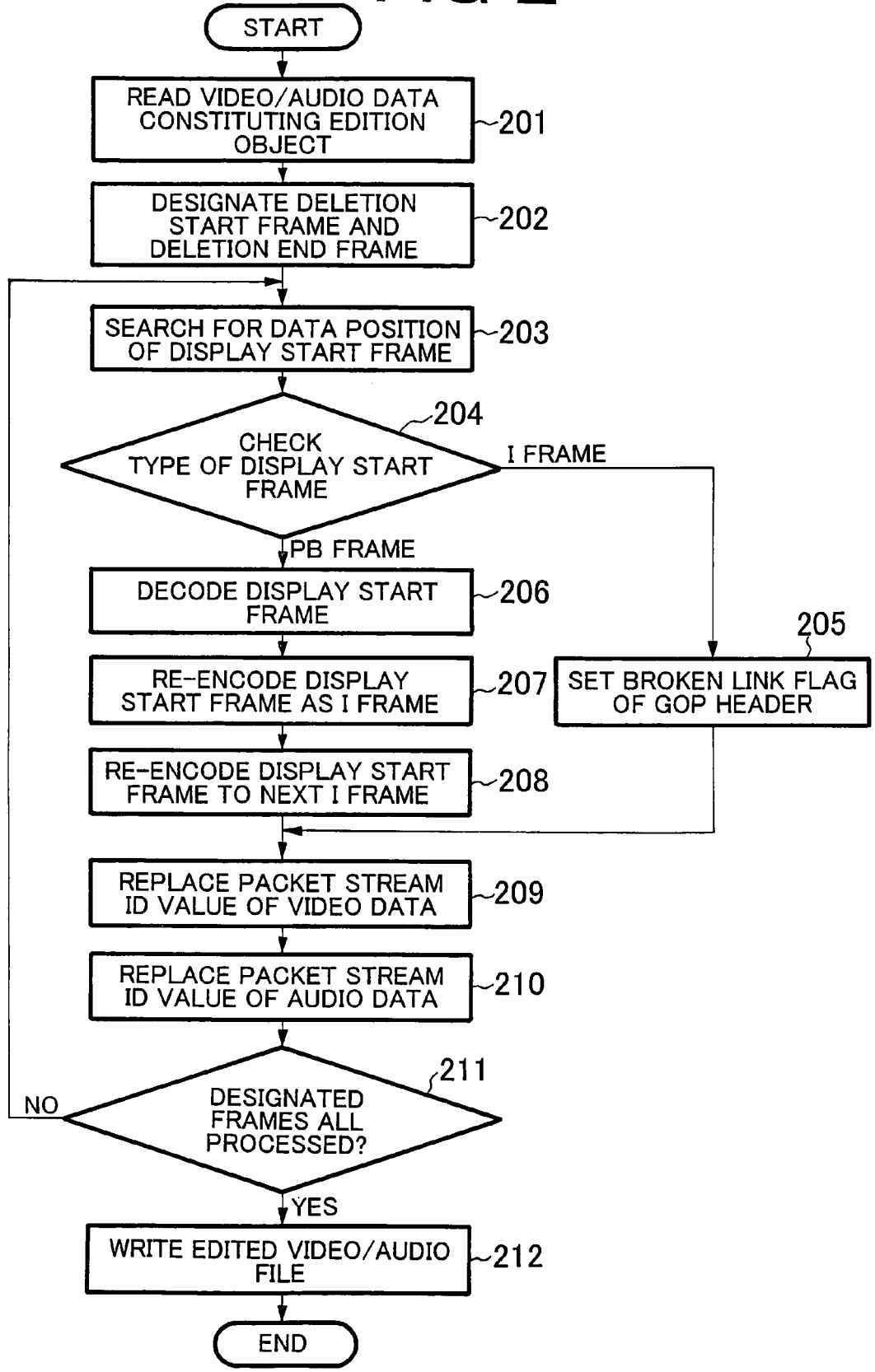
FIG. 2 is a flowchart showing an operation of an editing process in the video editing apparatus according to the first embodiment of the present invention.

Here, as shown in FIG. 4, at the time of the editing, the user designates the arbitrary deletion start frame and deletion end frame (step 202 of FIG. 2).

The display start frame next to the deletion end frame is not the top of the GOP which is the editing unit. In this case, the frames including the display start frame to the next GOP start frame are re-encoded (steps 206 to 208).

Moreover, when the attribute of the packet start code of all the video/audio data between the deletion start frame and the deletion end frame is set to the padding packet (private packet), reproduced data is nullified (steps 209, 210).

In FIG. 4, hatched displayed frames indicate the re-encoded frames.

In this editing process, only partial data of the part to be deleted is rewritten, and it is therefore possible to execute the editing process at a high rate.

Additionally, since the time information such as the PTS, DTS, SCR, and PCR values is discontinuous, the time information becomes wrong depending on a reproduction device. There is a possibility that the video/audio data cannot synchronously be reproduced correctly. In the present invention, when the edited data is duplicated in the recording medium 300 such as rewritable CD and DVD, the padding packet is removed (steps 304 to 307 of FIG. 3). Furthermore, the time information is corrected (steps 308 and 309 of FIG. 3). Therefore, it is possible to finally obtain the video/audio data (MPEG data) such that the file capacity is reduced and correct synchronous reproduction can be performed.

In the first embodiment, the process of correcting the time information is carried out at the time of the duplication into the recording medium 300, but this correction process can also be carried out at the time of the editing. In this case, a process time at the time of the editing becomes longer than that in the first embodiment, but the prepared and edited video/audio data (MPEG data) can correctly and synchronously be reproduced regardless of the reproduction device. Moreover, at the time of the duplication into the recording medium 300, the data can be reproduced without performing the correction process of the time information.

Moreover, a process for nullifying the removed part of the video/audio data (MPEG data) is realized by rewriting the ID value of the packet start code (packet header) with the packet stream ID value, but the part can also be nullified, for example, as another private stream. The size of the nullified data may also be stored in the private stream. In this case, when a reproduction device for performing a process of referring to the data size to skip the reading is prepared, it is possible to increase the rate of the file read process.

Next, the video editing apparatus according to a second embodiment of the present invention will be described in detail with reference to FIG. 5.

Figure 5:
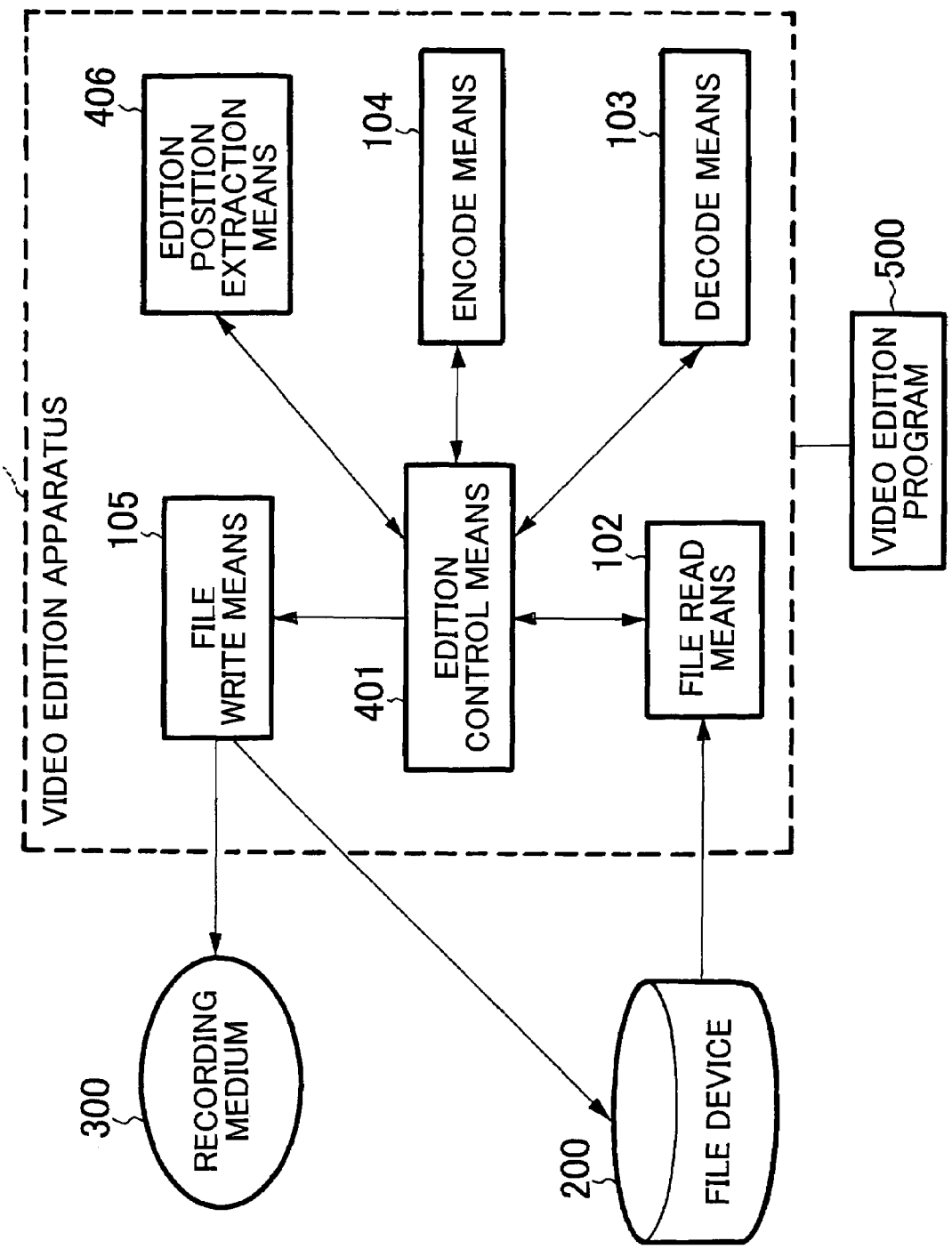
FIG. 5 is a block diagram showing the constitution of the video editing apparatus according to a second embodiment of the present invention.
Figure 6:
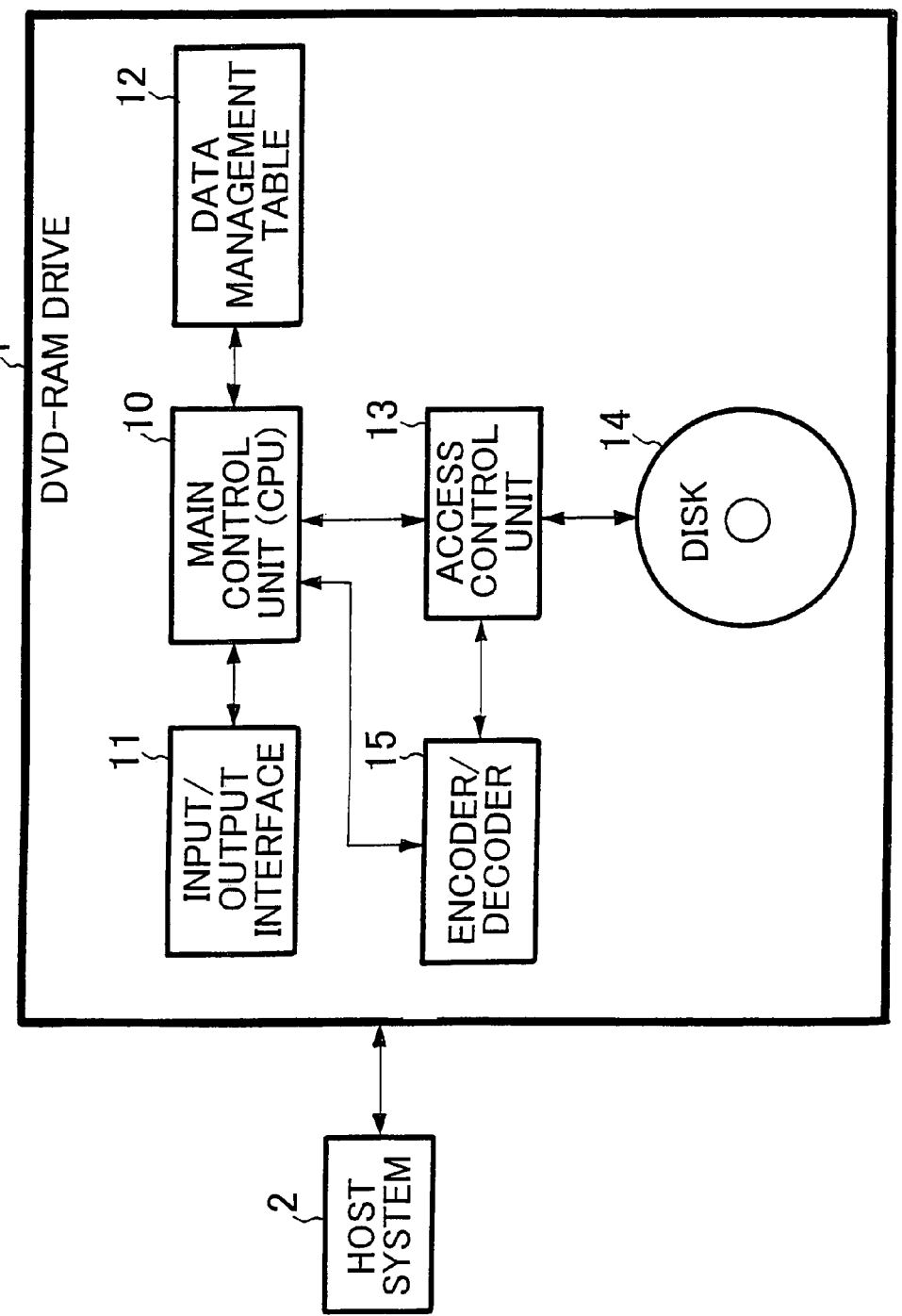
FIG. 6 is a block diagram showing one constitution example of a video editing apparatus which has heretofore been known.

Referring to FIG. 5, the video editing apparatus according to the second embodiment of the present invention is constituted of a video editing apparatus 400 which operates by the program control, the file device 200, and the recording medium 300.

The video editing apparatus 400 includes editing control means 401, file read means 102, decode means 103, encode means 104, file write means 105, and editing position extraction means 406.

Here, the editing control means 401 obtains the range of the video/audio data to be deleted from the deletion start frame and deletion end frame designated by the editing position extraction means 406, and replaces the header of the video/audio data to be deleted with the padding header to nullify the video/audio data.

The editing position extraction means 406 extracts a format change point of the audio data, and determines the corresponding video frame.

Next, a respect of the operation of the present embodiment different from that of the first embodiment will be described.

The editing position extraction means 406 of the present embodiment inspects a format (stereo, monaural, and sound multiplex formats) of the audio data of the whole video/audio data (MPEG data), and extracts all change points of the format.

Furthermore, the editing position extraction means 406 extracts the PTS value of the audio data in the change point of the format, and presents start and end frames of the video frames including the PTS value as the reproduction time as the deletion start frame and deletion end frame, that is, editing candidate positions to the user. When the presented editing candidate position is as desired by the user, the editing described in the first embodiment is started as such by an instruction from the user. When the editing candidate position does not meet the user's desire, the user deletes the editing candidate position, or finely adjusts the position to change the position. After performing this process, the editing is started.

For the other operations, the operations similar to those of the first embodiment (steps 203 to 211 of FIG. 2, steps 301 to 310 of FIG. 3) are performed, and therefore the description thereof is omitted.

It is to be noted that by a combined use of the functions according to the first and second embodiments, the position to be edited may also be designated in accordance with user's selection.

Needless to say, in the above-described video editing apparatus, the functions such as the function of the editing control means 101 of the video editing apparatus 100 are realized in a hardware manner. Additionally, a video editing program (application) 500 for executing the above-described functions is loaded onto the memory of the video editing apparatus 100 constituted of the computer device including the CPU and memory, and is executed. Accordingly, the functions can be realized in a software manner. The video editing program 500 controls the CPU of the video editing apparatus 100 to execute the editing process shown in FIGS. 2 and 3. The video editing program 500 is stored in the recording mediums such as a computer-readable magnetic disk and a semiconductor memory, and is loaded onto the video editing apparatus 100 from the recording mediums.

The present invention has been described above in accordance with the preferable embodiments and examples, but the present invention is not necessarily limited to the embodiments or examples, and can variously be modified and practiced within the scope of the technical thought.

The MPEG data has been described above as the example of the video/audio data, but the data is not limited to the MPEG data and, needless to say, the present invention can be applied to any data.

According to the video editing apparatus of the present invention described above, the following superior effects are produced.

A first effect lies in that the video/audio data constituted by multiplexing the image and sound data can be edited at the high speed. This is because the means for nullifying the frames of the deleted part of the designated video/audio data is disposed.

A second effect lies in that the edited data can also be reproduced even on the usual reproduction device. This is because the means for correcting the time information for the synchronous reproduction of the video and audio data is disposed.

A third effect lies in that the data region nullified when duplicating the video/audio data in the recording medium can be removed to effectively use the capacity of the recording medium. This is because the means for judging and removing the data region nullified after the editing at the time of the duplication is disposed.

What is claimed is:

1. Apparatus for editing video/audio data in which image and sound data are multiplexed, comprising:
    means for designating a range of the video/audio data to be an editing object by using a deletion start frame and deletion end frame thereof;
    editing control means for rewriting a header of video data in the designated range to constitute nullified data and for rewriting a header of audio data including the same synchronous reproduction time in the designated range to constitute the nullified data; and
    editing position extraction means for extracting a format change part of the audio data in the video/audio data which is the editing object to provide a range of the video data including the same reproduction time as that in the format change part as the deletion start frame and the deletion end frame.

2. The apparatus according to claim 1, wherein said editing control means rewrites an ID of the header of the video data and audio data in the designated range with a padding stream ID to constitute the nullified data.

3. The apparatus according to claim 1, wherein said editing control means re-encodes a frame next to the deletion end frame of the video data as a frame which does not require information of another frame in extension to nullify the video data to the deletion end frame from the deletion start frame, when the next frame is a frame which requires the information of another frame in the extension.

4. The apparatus according to claim 1, wherein said editing control means removes the nullified video/audio data part and writes the video/audio data into a writable recording medium, when duplicating the edited video/audio data in the recording medium.

5. The apparatus according to claim 4, wherein said editing control means judges the nullified video/audio data part based on a stream ID of the video/audio data to remove the nullified video/audio data part, and writes the video/audio data in the writable recording medium, when duplicating the edited video/audio data in the recording medium.

6. The apparatus according to claim 4, wherein said editing control means acquires a reproduction time of the video data before/after the nullified video/audio data part, obtains a difference between the reproduction time before the nullified video/audio data part and that after the nullified video/audio data part, which is an offset value, uses the offset value to correct the reproduction time of the video/audio data of and after the nullified video/audio data part, and writes the video/audio data in the recording medium.

7. The apparatus according to claim 4, wherein said editing control means acquires a reproduction time of the video data before/after the nullified video/audio data part, obtains a difference between the reproduction time before the nullified video/audio data part and that after the nullified video/audio data part, which is an offset value, and uses the offset value to correct the reproduction time of the video/audio data of and after the nullified video/audio data part in a nullification process of the video/audio data.

8. The apparatus according to claim 4, wherein said editing control means rewrites the header of video data and the audio data in the designated range, using a private header indicating a data size to be nullified, to constitute the nullified data, and skips reading the nullified video/audio data part, referring to the data size of the private header, to write the video/audio data in the recording medium, when duplicating the edited video/audio data into the writable recording medium.

9. The apparatus according to claim 1, wherein
    said video/audio data is MPEG data, and
    said editing control means rewrites packet headers of said video data and said audio data to constitute the nullified data.

10. The apparatus according to claim 9, wherein said editing control means re-encodes the frame next to the deletion end frame of the video data as an I frame to nullify the video data including the deletion start frame to the deletion end frame, when the next frame is not the I frame.

11. A method of editing video/audio data in which image and sound data are multiplexed, comprising the steps of:
    designating a range of the video/audio data to be an editing object by using a deletion start frame and deletion end frame thereof;
    rewriting a header of video data in the designated range to constitute nullified data and rewriting a header of audio data including the same synchronous reproduction time in the designated range to constitute the nullified data; and
    extracting a format change part of the audio data in the video/audio data which is the editing object to provide a range of the video data including the same reproduction time as that in the format change part as the deletion start frame and the deletion end frame.

12. The method according to claim 11, wherein said rewriting step comprises the step of rewriting an ID of the header of the video data and audio data in the designated range with a padding stream ID to constitute the nullified data.

13. The method according to claim 11, wherein said rewriting step comprises the step of re-encoding a frame next to the deletion end frame of the video data as a frame which does not require information of another frame in extension to nullify the video data to the deletion end frame from the deletion start frame, when the next frame is a frame which requires the information of another frame in the extension.

14. The method according to claim 11, wherein said rewriting step comprises the steps of
removing the nullified video/audio data part, when duplicating the edited video/audio data in the recording medium and
writing the video/audio data into a writable recording medium.

15. The method according to claim 14, wherein said rewriting step further comprises the steps of
judging the nullified video/audio data part based on a stream ID of the video/audio data to remove the nullified video/audio data part, when duplicating the edited video/audio data in the recording medium and
writing the video/audio data in the writable recording medium.

16. The method according to claim 14, wherein said rewriting step further comprises the steps of
acquiring a reproduction time of the video data before/after the nullified video/audio data part,
obtaining a difference between the reproduction time before the nullified video/audio data part and that after the nullified video/audio data part, which is an offset value, using the offset value to correct the reproduction time of the video/audio data of and after the nullified video/audio data part, and
writing the video/audio data in the recording medium.

17. The method according to claim 14, wherein said rewriting step further comprises the steps of
acquiring a reproduction time of the video data before/after the nullified video/audio data part,
obtaining a difference between the reproduction time before the nullified video/audio data part and that after the nullified video/audio data part, which is an offset value, and
using the offset value to correct the reproduction time of the video/audio data of and after the nullified video/audio data part in a nullification process of the video/audio data.

18. The method according to claim 14, wherein said rewriting step further comprises the steps of
rewriting the header of the video data and the audio data in the designated range, using a private header indicating a data size to be nullified, to constitute the nullified data, and
skipping reading the nullified video/audio data part, referring to the data size of the private header, to write the video/audio data in the recording medium, when duplicating the edited video/audio data into the writable recording medium.

19. The method according to claim 11, wherein
said video/audio data is MPEG data, and
said rewriting step comprises the step of rewriting packet headers of said video data and said audio data to constitute the nullified data.

20. The method according to claim 19, wherein said rewriting step comprises the step of re-encoding the frame next to the deletion end frame of the video data as an I frame to nullify the video data including the deletion start frame to the deletion end frame, when the next frame is not the I frame.

21. A computer program, encoded in a computer-readable medium, for enabling a computer to execute a method of editing video/audio data in which image and sound data are multiplexed, the method comprising the steps of:
designating a range of the video/audio data to be an editing object by using a deletion start frame and deletion end frame thereof;
rewriting a header of video data in the designated range to constitute nullified data and rewriting a header of audio data including the same synchronous reproduction time in the designated range to constitute the nullified data; and
extracting a format change part of the audio data in the video/audio data which is the editing object to provide a range of the video data which is the editing object to provide a range of the video data including the same reproduction time as that in the format change part as the deletion start frame and the deletion end frame.

* * * * *